Patented Aug. 5, 1947

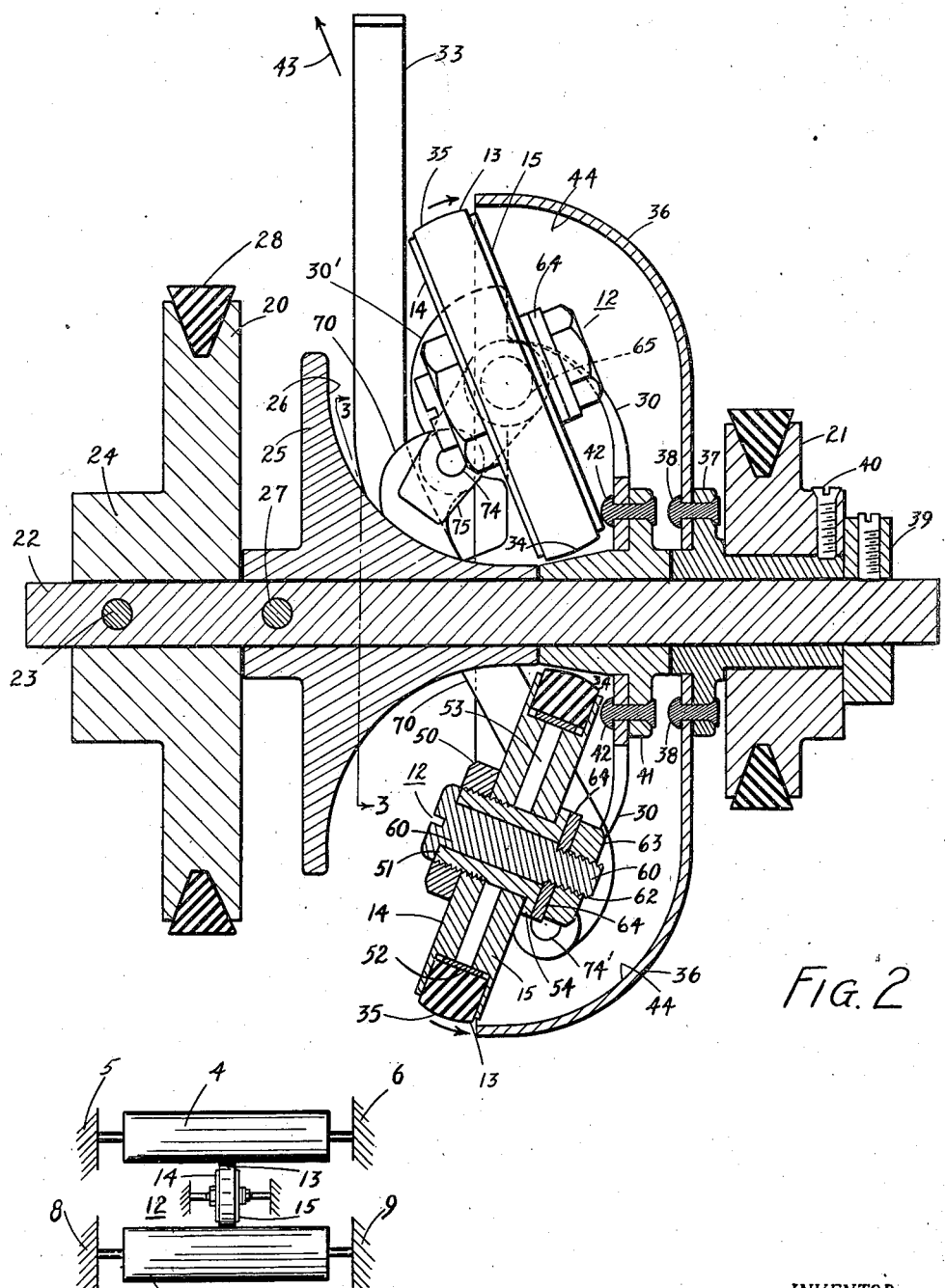

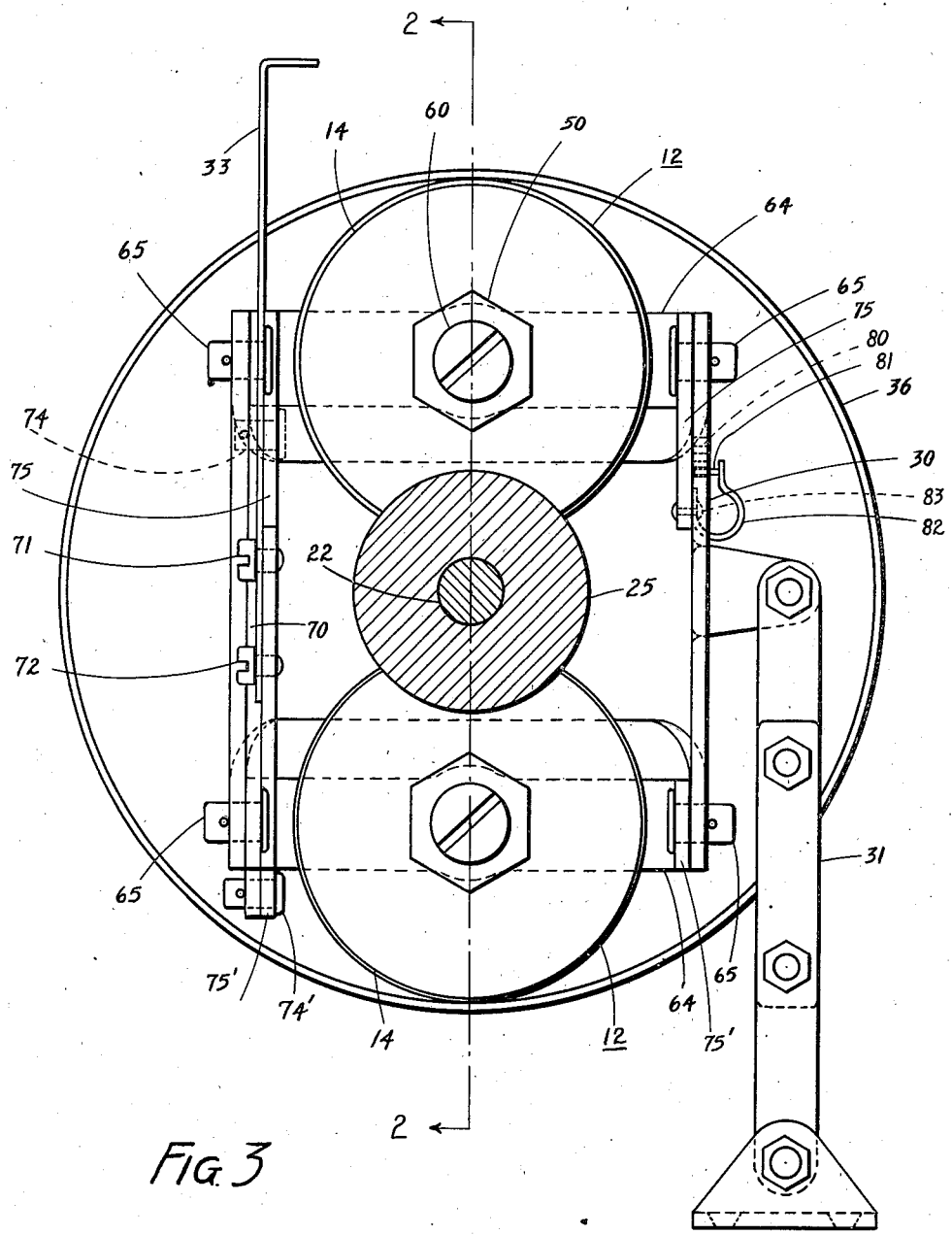

2,425,188

UNITED STATES PATENT OFFICE 2,425,188

MOTION TRANSMITTING MEANS AND ADJUSTMENT THEREOF

Hans Honigman, East Cleveland, Ohio

Application December 18, 1943, Serial No. 514,737

8 Claims. (Cl. 74—200)

My invention pertains to motion transmitting mechanisms, and more particularly to adjustable wear compensating means for use in variable speed controllers and clutch mechanisms.

An object of my invention is to provide a motion transmitting mechanism which is easily adjusted to compensate for wear in the moving parts thereof.

Another object of my invention is to provide a motion transmitting coupling between a driving and a driven member which is adjustable without moving either the driving or the driven member.

A further object of my invention is to provide a new and simple adjustment for a variable speed controller and clutch mechanism.

It is also an object of my invention to reduce vibrations between a driving and a driven member.

Another object of my invention is to substantially balance lateral pressures set up in a drive system.

An object of my invention is to provide a new and novel motion transmitting and clutch mechanism.

Other objects and a fuller understanding of my invention may be had by referring to the following description and claims taken in conjunction with the drawings in which:

Figure 1 is a schematic view of a device utilizing my invention.

Figure 2 is a side view, mostly in cross-section, showing a multiple speed drive utilizing my invention, and Figure 3 is a sectional view taken along line 3—3 of the device shown in Figure 2.

With reference to Figure 1, my invention is exemplified by first rotatable means such as the roller 4 mounted for rotary motion by means of fixed bearings 5 and 6, and a second rotatable means such as the roller 7 mounted away from but parallel to the roller 4 for rotary motion by means of fixed bearings 8 and 9. One of the rollers, for example, roller 7, may be driven from an external source such as a motor (not shown) by means of a belt or other such means (not shown), and it is desired to transmit motion to the roller 4.

For transmitting the motion between roller 7 and roller 4 I provide a coupling member which is indicated generally by the reference character 12, and which comprises a wheel having an axis of rotation parallel to the axes of rotation of the rollers 4 and 7 and fixed against all but rotary motion. The wheel has a central portion 13 which in this example is shown in frictional engagement with the faces of the rollers 4 and 7, and on either side of the central portion 13 there is a plate 14, 15. The central portion 13 is made of rubber, leather, synthetic rubber, or any other flexible material which is slightly yieldable under pressure and has a certain amount of resiliency.

During long service the central portion 13 wears down to an extent that it no longer positively couples the rollers 4 and 7 together, and slippage, with consequent frictional heating, inefficient motion transmission and accelerated wear on the central portion 13 results. By squeezing the central portion 13 together between the plates 14 and 15 by means of a nut and bolt arrangement indicated generally by the reference character 16 (to be more fully described later) the diameter of the central portion 13 of the coupling means is slightly increased to an extent that positive coupling between rollers 4 and 7 is regained without moving either of the rollers 4 or 7 and without moving the location of the axis of the coupling wheel 12.

The principle of increasing the diameter of the coupling member 12 is applied in the variable speed drive and clutch device which is shown in Figures 2 and 3, and provides a new method of adjusting such a device and because of this new method of adjusting the coupling member it has become possible to design the device shown in Figures 2 and 3 in a manner which provides a much wider range of speeds.

In Figure 2 there is shown two pulleys 20 and 21 coupled together by my new coupling means. Either pulley 20 or 21 may be the driving member and the other the driven member. In my description I shall treat pulley 20 as the driving member and pulley 21 as the driven member.

The pulley 20 is rigidly connected to a shaft 22 by means of a pin 23 which passes through an extended hub portion 24 of the pulley 20, and the end portions of the shaft 22 are adapted to be mounted in supporting bearings (not shown). A rotatable flange 25 having a curved face portion 26 is connected to the shaft 22 by means of the pin 27, or other such device, in such a manner that as the pulley 20 is rotated, as by external motor means which may be connected to it by a V belt 28, the flange 25 is rotated.

Two rotatable coupling members 12, 12 are mounted for turning about an axis extending through pins 65, 65 (Figure 3) when the lever 33 is moved, and is also mounted for rotation about its own axis.

A bracket 30 is attached by means of rivets 42 to a bearing member 41 which floats on the shaft 22 and is maintained stationary by a leg 31 which may be bolted to an external support. Plates 64 are connected to the bracket 30 by the pins 65, 65, and each of the coupling members 12, 12 is mounted on one of the plates 64 and is adapted to rotate with respect to the plate upon which it is mounted. As shown in Figure 2, these two coupling members 12, 12 are in their disengaged position. They are, however, adapted to be turned into position by pulling the lever 33 in the direction of arrow 43 until the frictional coupling faces 34 engage the portion of the curved face 26 which is of smallest circumference. At the same time that faces 34 come into contact with the curved face 26 of the flange 25 the coupling faces 35 engage the inner face of a circular drum 36. Connected to the lever 33 by means of the two screws 71, 72 is an arm 70, and pivotally connected to one end of the arm 70 by the pivot pin 74 is a second arm 75. The other end of the arm 70 is connected to another arm 75' by means of the pivot pin 74'. Each of the arms 75 and 75' is connected to or integral with one of the plates 64, and the coupling members 12, 12 are connected to the plates 64 as will later be described in detail.

The drum 36 is adapted to rotate with respect to the shaft 22, and is mounted upon the shaft 22 by means of the collar 37 to which it is connected by means of rivets 38, and the collar 37 is connected to the pulley 21 by means of the set screw 40. Obviously, if it is so desired, the collar 37 and the pulley 21 could be one piece.

The collar 37 rides on the shaft 22 and can turn at a different rate of rotation than the shaft. It may be necessary to provide means for applying lubrication between these two parts. A collar 39 may be connected to the shaft 22 by a set screw or other such device for helping to maintain the pulley 21 in place on the shaft 22, and means may be provided for applying lubrication between the collar 39 and the pulley 21.

When the lever 33 is pulled slightly in the direction of arrow 43, the arm 70 is moved thereby causing the arms 75, 75' to turn slightly, thereby turning each of the coupling members 12, 12 to cause the inner contacting portion 34 of each to move into frictional driving engagement with the portion of the flange 25 which has the smallest diameter. At the same time, the contacting portion 35 of each of the coupling members will move into frictional driving engagement with a portion of the inner face 44 of the drum 36. The flange 25 will cause each of the coupling members 12, 12 to rotate about its axis, and the coupling members will cause the drum 36 to rotate, thereby transmitting motion from pulley 20 to pulley 21.

With the contact faces 34 of the coupling members 12, 12 touching the portion of the curved face 26 which has the smallest circumference the drum 36 will turn at its slowest speed, but as the lever 33 is pulled further in the direction of arrow 43 the coupling members 12, 12 will be further turned and the contact faces 34, 34 will engage the curved face 26 of the flange 25 at points further away from its axis of rotation where the circumference of the face portion is greater. This will cause the drum 36 to be driven at a faster rate of speed. This establishes a variable speed drive.

The radius of curvature of the face 26 in a plane extending through and parallel to the axis of the shaft 22 is the same as the radius of curvature of the inner face 44 of the drum 36, and the center of the two radii is the center point of the coupling member 12 about which it is rotated to establish frictional driving contact. Therefore, as the coupling members 12, 12 are turned by pulling lever 33 to cause the contact faces 34 thereof to engage the curved face 26 further and further away from the axis of rotation about shaft 22, the contact face 35 will always be in frictional engagement with the curved face 44 of the drum 36, and the drum will rotate faster and faster.

It will be seen, therefore, that when the lever 33 and the coupling members 12, 12 are in the position shown in Figure 2, there will be no motion transmitted from pulley 20 to pulley 21, but if the lever is moved slightly the pulley 21 will be coupled to pulley 20, thus establishing a clutch action. It will also be seen that as the lever 33 is moved more and more in the direction of arrow 43, the speed of pulley 21 with respect to the speed of pulley 20 will increase, thus establishing a variable speed drive system having, theoretically, an infinite range of speed variations for each given speed of pulley 20.

Heretofore, in systems somewhat analogous to the described system, as the friction between the coupling members 12, 12 and the flange 25 and drum 36 wore the frictional material down, slippage occurred and adjustment was made by moving the drum 36 axially toward the flange 25 or by moving the flange 25 axially toward the drum 36. This meant that the coupling members, such as 12, 12, could not be mounted to turn through an angle of 90° or more, thereby greatly limiting the range of speeds at which the pulley 21 could be driven.

With my adjustable coupling member 12, all that is necessary is that the nut 50 be turned with respect to the hollow threaded shaft 51, thereby moving plates 14 and 15 toward each other and causing the flexible frictional engaging portion 13 to be squeezed, thereby increasing the diameter of the coupling member (or wheel) until it regains its most effective contact with the flange 25 and the drum 36. A spring 52 is provided in the coupling member 12 to prevent the flexible portion 13 from being squeezed into the space 53 between the side plates 14, 15.

By providing coupling members 12, 12 with means for extending their diameters I establish a new method of adjusting mechanisms of the variable speed type, and it is now possible to mount the coupling members 12, 12 with their axes substantially parallel to the axis of the shaft 22 (when the drive is in its lowest speed) and to provide for turning the coupling members 12, 12 through an angle of about 90 degrees at which point there is substantially a direct drive from flange 25 to drum 36, that is, the drum 36 will be rotating at about the same speed as the flange 25.

Heretofore, the coupling member 12 had to extend in such a direction that its axis of rotation was perpendicular to the shaft 22 in order to provide for adjustment by moving either the flange 25 or the collar 37 along the shaft 22.

Each of the coupling members 12, 12 is adapted to rotate about a stud 60 which has a threaded end 62, and about which the hollow threaded shaft 15 is positioned, the slippage taking place between the shaft 51 and the stud 60 which thereby acts as a bearing. Means for lubricating the frictional engagement between the shaft 51 and the stud 60 may be provided. A nut 63 is screwed onto the end 62 of the stud 60 for maintaining the plate 64 up against a shoulder on the stud 60, thereby connecting the coupling wheel 12 to the bracket 30. When the nut 63 is screwed firmly against the plate 64 and the plate 64 is firmly against the shoulder on the stud 60, there should be no binding between the plate 64 and the shoulder portion of the hollow shaft 51 as slippage must take place there. By so connecting the coupling members 12, 12 to the shafts about which they rotate, it is an easy matter to replace either the entire wheel portion comprised of the tire or engaging portion, the spring 52, and the side plates 14, 15; or to replace only the tire portion 13 when it is worn out.

In order that the rate of rotation of the pulley 21 may be maintained constant after pulling lever 33 until a desired speed is obtained, I provide means for retaining the lever 33 in any one of a number of selectible positions. This is done by providing a number of holes 80 in the bracket 30. Into these holes there is adapted to be positioned a pin 81 which is biased toward the holes by the spring 82. The spring 82 is mounted on the arm 75 by means of a rivet 83. In operation, as the lever 33 is pulled the arm 75 rotates, and at any desired rate of rotation of the pulley 21 the pin 81 is allowed to drop into a hole 80, thereby maintaining the desired rate of rotation. The bracket 30 has an enlarged portion 31' (shown in Figure 2) which has the holes 80.

Although I have described my invention with a certain degree of particularity, it is to be understood that numerous changes in the parts and their arrangement can be made without departing from the spirit or scope of my invention as set forth in the claims.

1. In a variable speed drive device, a rotatable shaft, a first rotatable flange having a curved face portion and a straight portion tangent to said curved face portion, means rigidly connecting said first flange to said shaft with said straight portion close thereto, a second rotatable flange having a curved face portion and a straight portion tangent to said curved face portion, said second flange being mounted concentrically on said shaft for rotatable motion with respect thereto with said straight portion spaced away from and substantially parallel to the straight portion of said first flange, a friction roller mounted for rotary motion and positioned between said first and said second rotatable flanges, means for moving said friction roller into engagement with both of said curved face portions for transmitting rotary motion from one of said flanges to the other at variable speeds depending upon the position of said friction roller with respect to said first and second curved face portions, the axis of said friction roller lying parallel to said shaft when motion is transmitted from said first to said second rotatable flange at the lowest speed ratio and the peripheral surface of said roller gradually coming into contact substantially simultaneously with the said straight portions of said first and second flanges whereby said second rotatable flange very gradually starts to rotate as said first flange drives said friction roller.

2. In a variable speed drive device as set forth in claim 1, the further characterization that as said friction roller is moved into engagement with the curved face portions of said first and second flanges it substantially simultaneously engages both of them.

3. In a variable speed drive device as set forth in claim 1, the further characterization that when said variable speed drive device is in its neutral position said friction roller is out of contact with both of said flanges whereby idling of the device causes no wear on the said friction roller.

4. In a variable speed drive device as set forth in claim 1, the further characterization that one of said flanges is the driving flange and the other is the driven flange, and when said variable speed drive device is in its neutral position said friction roller is out of contact with the driving flange whereby idling of the device causes no wear on the said friction roller.

5. In a variable speed drive and clutch device, a shaft, a first rotatable flange having a toriodially curved face portion rigidly mounted on said shaft, a cup-shaped second rotatable flange having a toroidally curved face portion mounted on and concentric with said shaft and for rotary motion with respect thereto, the outer edge portion of said cup-shaped flange overlying the smallest diameter portion of said first flange and defining a plane perpendicular to said shaft, a friction roller mounted for pivotal motion and positioned between said first and said second curved face portions, means for pivotally moving said friction roller into contact with the face of said first flange at its smallest diameter and into contact with the face of said second flange at its largest diameter for transmitting motion at a low ratio from said first to said second flange, said friction roller in said position rotating about an axis substantially parallel to said shaft, and said friction roller upon further pivotal motion increasing the rate of rotation of the second flange with respect to the rate of rotation of the first flange.

6. In a variable speed drive device as set forth in claim 5, the further characterization that said cup-shaped second flange over-lies said first flange by an amount substantially equal to the thickness of said friction roller whereby the friction roller is substantially perpendicular to said shaft when it is in initial full engagement with both of said flanges.

7. In a variable speed drive device as set forth in claim 5, the further characterization that as said friction roller is moved into engagement with the curved face portions of said first and second flanges it substantially simultaneously engages both of them.

8. In a variable speed drive device as set forth in claim 5, the further characterization that when said variable speed drive device is in its neutral position said friction roller is out of contact with both of said flanges, whereby idling of the device does not cause wear on the said friction roller.

HANS HONIGMAN.

REFERENCES CITED

The following references are of record in the file of this patent:

UNITED STATES PATENTS

| Number | Name | Date |
|---|---|---|
| 289,368 | Osborne | Nov. 27, 1883 |
| 2,151,566 | Sander | Mar. 21, 1939 |
| 1,033,991 | Cotoli | July 30, 1912 |

FOREIGN PATENTS

| Number | Country | Date |
|---|---|---|
| 896 | Great Britain | Feb. 24, 1882 |
| 405,809 | Germany | Nov. 24, 1924 |
| 376,760 | Italy | Aug. 11, 1939 |
| 220,331 | Great Britain | Aug. 11, 1924 |
| 5,235 | Great Britain | Feb. 27, 1908 |
| 628,460 | France | Oct. 24, 1927 |
| 108,325 | Switzerland | Oct. 11, 1922 |